United States Patent
Mayr

(10) Patent No.: US 8,788,511 B2
(45) Date of Patent: Jul. 22, 2014

(54) ENABLING SIEBEL DATABASE MANIPULATION BY USE OF A DIRECT SQL STATEMENT

(75) Inventor: Raoul Mayr, Hannover (DE)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/346,800

(22) Filed: Jan. 10, 2012

(65) Prior Publication Data

US 2013/0179458 A1 Jul. 11, 2013

(51) Int. Cl.
*G06F 17/30* (2006.01)

(52) U.S. Cl.
USPC ............. 707/755; 707/E17.014; 707/E17.045

(58) Field of Classification Search
USPC ........................................................ 707/755
See application file for complete search history.

(56) References Cited

U.S. PATENT DOCUMENTS

| | | | |
|---|---|---|---|
| 7,552,135 B2 | 6/2009 | Iyer et al. | |
| 7,630,953 B2 | 12/2009 | Stauber et al. | |
| 7,657,516 B2 * | 2/2010 | Zaman et al. | 707/999.004 |
| 7,680,759 B1 | 3/2010 | Coley et al. | |
| 7,761,406 B2 | 7/2010 | Harken | |
| 2004/0019587 A1 | 1/2004 | Fuh et al. | |
| 2005/0228803 A1 | 10/2005 | Farmer et al. | |
| 2007/0179931 A1 * | 8/2007 | Juby et al. | 707/2 |
| 2008/0098099 A1 * | 4/2008 | Khasnis et al. | 709/222 |
| 2008/0319957 A1 | 12/2008 | Muralidhar et al. | |
| 2009/0106294 A1 * | 4/2009 | Gutlapalli et al. | 707/102 |
| 2010/0114987 A1 * | 5/2010 | Tahiliani et al. | 707/805 |

OTHER PUBLICATIONS

Siebel 7 Using DB2 UDB V7.x Planning & Installation Guide for AIX/Win2K, Publish date: Apr. 17, 2002.*

* cited by examiner

*Primary Examiner* — Shyue Jiunn Hwa
(74) *Attorney, Agent, or Firm* — Schmeiser, Olsen & Watts, LLP; John Pivnichny

(57) ABSTRACT

A system and associated method for manipulating a Siebel database (SDB) with a Structured Query Language (SQL) statement utilizes a SQL-eScript parser, which uses a business component (BC) on a Siebel data model of the SDB, which has data elements corresponding to the data elements of the SQL statement to be performed against the SDB. In the SDB, data of the SDB is stored in relational database tables, accesses to the SDB must utilize a BC which describes and references a part of the Siebel data model. The SQL-eScript parser enables users to access the SDB by use of the SQL statement by interpreting the SQL statement and automatically identifying and utilizing a BC on the Siebel data model having all data elements of the SQL statement and performing eScript BC methods corresponding to operations of the SQL statement in updating the SDB.

16 Claims, 8 Drawing Sheets

ENABLING SIEBEL DATABASE MANIPULATION BY USE OF A DIRECT SQL STATEMENT

BACKGROUND OF THE INVENTION

The present invention discloses a system and associated method for manipulating an encapsulated database system having an extra object layer on top of relational database data model with a Structured Query Language (SQL) query input. Software vendors rarely support manipulating the encapsulated data system by directly changing the underlying relational database by use of SQL queries without either a time-consuming organizational decision procedure to get an approval for such a direct SQL or to design a new object layer and a subsequent development cycle to implement the new object layer for the data manipulation desired.

BRIEF SUMMARY

According to one embodiment of the present invention, a method for manipulating a Siebel database (SDB) with a Structured Query Language (SQL) statement comprises: receiving, by a parser running on a processor of a server system, the SQL statement from a client system coupled to the server system, wherein the SDB comprises a Siebel repository and at least one relational database (RDB) table, the Siebel repository comprising at least one business component (BC) that enables controlling of Siebel data model of the SDB, said at least one RDB table storing actual data of the Siebel data model in relational database format, wherein the Siebel data model described by the Siebel repository is independent from the relational database format of said at least one RDB table, wherein the SQL statement requests modification of a first RDB table of said at least one RDB table by setting a first column of the first RDB table to a first value for records of the first RDB table satisfying a first WHERE clause of the SQL statement; creating a BC list comprising at least one business component (BC) of the Siebel repository, said at least one BC being associated with the received SQL statement; selecting a BC of said at least one BC from the created BC list responsive to determining that the BC comprises all fields respectively corresponding to all columns of all RDB tables represented in the received SQL statement; identifying a first group of records of said all RDB tables, the first group of records corresponding to the selected BC; updating the identified first group of records within the RDB tables of the SDB pursuant to the received SQL statement; and communicating the updated first group of records of the SDB to the client system.

According to one embodiment of the present invention, a computer program product comprises a computer readable memory unit that embodies a computer readable program code. The computer readable program code contains instructions that, when run by a processor of a computer system, implement aforementioned manipulating a Siebel database (SDB) with a Structured Query Language (SQL) statement.

According to one embodiment of the present invention, a computer system comprises a processor, a memory coupled to the processor, and a computer readable storage device coupled to the processor, said storage device containing program code configured to be executed by the processor via the memory to implement aforementioned manipulating a Siebel database (SDB) with a Structured Query Language (SQL) statement.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing aforementioned manipulating a Siebel database (SDB) with a Structured Query Language (SQL) statement.

DETAILED DESCRIPTION

Figure 1:
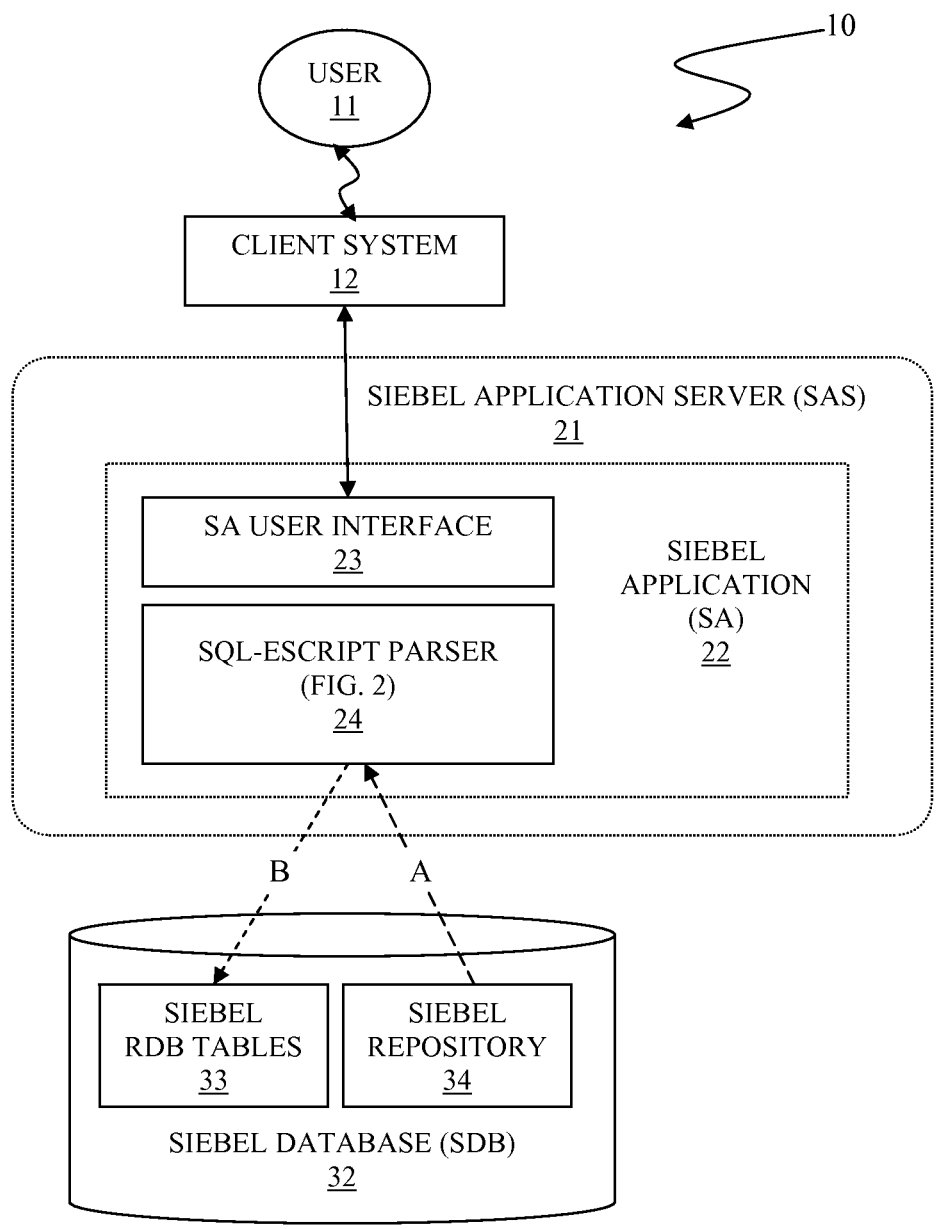
FIG. 1 illustrates a system 10 for manipulating a Siebel database (SDB) with a Structured Query Language (SQL) statement, in accordance with embodiments of the present invention.

FIG. 1 illustrates a system 10 for manipulating a Siebel database (SDB) 32 with a Structured Query Language (SQL) statement, in accordance with embodiments of the present invention.

The system 10 comprises a user 11, a client system 12, and a Siebel® Application Server (SAS) 21. (Siebel is a registered trademark of Oracle Corporation and/or its affiliates in the United States and/or other countries.) The user 11 is a human user or an external software program using the client system 12 in accessing the SAS 21. In this specification, terms "SQL query" and "SQL statement" are used interchangeably to denote data manipulation directives written in Structured Query Language (SQL).

The client system 12 is a computer system that originates a SQL statement upon input by the user 11, sends the SQL statement to the SAS 21, receives a result returned from the SAS 21, and communicates the result to the user 11. The client system 12 interacts with the SAS 21 by use of a Siebel Application (SA) 22. The client system 12 and the SAS 21 establish a communication session, or simply a session, through which the SQL statement is transferred and the result is returned. Examples of the client system 12 may be, inter alia, a web-based graphical user interface (GUI), a command line prompt, etc. In this specification, terms "communication session" and "session" are used interchangeably. In one embodiment of the present invention, the client system 12 is implemented on an AIX®-based UNIX® server, a Sun® server, or a Windows® server, etc. (AIX is a registered trademark of International Business Machines Corporation in the United States and/or other countries; UNIX is a registered trademark of The Open Group in the United States and/or other countries; Sun is a registered trademark of Oracle corporation in the United States and/or other countries; and Windows is a registered trademark of Microsoft corporation in the United States and/or other countries.)

The SAS 21 comprises the Siebel Application (SA) 22. The SA 22 comprises a SA user interface 23 and a SQL-eScript Parser 24. The SQL-eScript Parser 24 of the SA 22 is operatively coupled to the Siebel DB 32 via a connection between the SAS 21 and the Siebel DB (SDB) 32. The SDB 32 comprises one or more Siebel relational database (RDB) tables 33 and a Siebel repository 34. The term "Siebel RDB tables" refers to all relational database tables that are not part of the Siebel repository 34.

The SA user interface 23 is an instance of the communication session running on the SAS 21 directed to and from the client system 12. In order to communicate with the SAS 21, the client system 12 establishes the SA user interface 23 by logging in to the SAS 21, which creates the communication session on the SAS 21 enabling the client system 12 to invoke the SQL-eScript Parser 24.

The SQL-eScript Parser 24 is a module that receives a native SQL statement from the client system 12, identifies a Siebel object in the Siebel repository 34 that correlates to tables/fields appearing in the received SQL statement, transforms the received SQL statement into one or more Siebel data manipulation directives in eScript format for the data stored in the Siebel RDB tables 33 by utilizing the identified Siebel object, performs the transformed Siebel data manipulation directives against the Siebel RDB tables 33 using the identified Siebel object, and returns the result of manipulating the Siebel RDB tables 33 with the received SQL statement to the client system 12. Arrow A represents Siebel objects from the Siebel repository 34 as retrieved by the SQL-eScript Parser 24. Arrow B represents operations on the Siebel RDB tables 33 by use of the Siebel data manipulation directives as sent by the SQL-eScript Parser 24. See descriptions of FIG. 2, infra, for steps performed by the SQL-eScript Parser 24. In this specification, terms "Siebel object" and "object" are used interchangeably.

The Siebel repository 34 comprises Siebel objects that enable the SA 22 to directly control a Siebel data model that is independent from a relational database management systems (RDBMSs) supporting the SDB 32. The Siebel RDB tables 33 store actual data in the underlying RDBMS for the SDB 32. The SA 22, by use of the objects in the Siebel repository 34, directly controls the Siebel data model specific to the SA 22 such that the SA 22 operates without RDBMS product dependency and such that the SA 22 is portable among different RDBMSs. The Siebel repository 34 comprises metadata describing at least one Siebel object pursuant to the Siebel data model. A Business Component (BC) is a Siebel object based on the Siebel RDB tables 33 that define structure, behavior, and information displayed by a particular subject, such as a product, contact, or account. The Siebel repository 34 comprises description of RDBMS objects and control information. Examples of the RDBMS objects may be, inter alia, tables, indexes, etc. The control information manages referential integrity and dependency between data. To access data in the RDBMS underlying the SDB 32, the SA 22 must utilize the data model control information of the Siebel repository 34.

In this specification, terms "Siebel object", "Siebel Business Component", and "BC" are used interchangeably. Each BC is represented by at least one Siebel RDB table of the Siebel RDB tables 33, which is also referred to as a base table. A BC defines a logical entity that associates columns from the Siebel RDB tables 33. BCs provide a layer of wrapping over the Siebel RDB tables 33, and the SA 22 references the BCs rather than the underlying Siebel RDB tables 33 such that the SAS 21 enables developers of Siebel applications to define a BC comprising columns from the Siebel RDB tables 33 and to define behaviors of the BC as well. The present invention transforms a SQL data manipulation statement into an equivalent Siebel-eScript code referencing an appropriate BC and subsequently executes the equivalent Siebel-eScript code which references the appropriate BC such that the user 11 performs an update corresponding to the SQL query on data stored in the Siebel RDB tables 33 of the Siebel DB 32. An example of the SQL data manipulation statement is, inter alia, UPDATE. In this specification, the term "Business Component (BC)" is defined as a Siebel representation of a single logical entity that can associate columns from one or more Siebel RDB tables 33. In this specification, terms "table" and "record" are used interchangeably, and terms "column" and "attribute" are used interchangeably.

A BC comprises a base table stored in the Siebel RDB tables 33, to which the BC refers. In this specification, all data referred from the base table of the BC is assumed to be accessible for read and/or write without restriction. The BC may further comprise zero or more joined tables, which are also a respective physical table stored in the Siebel RDB tables 33. Data referred to via a joined table of the BC is read-only. Each column of the base table or a joined table stored in the Siebel RDB tables 33 corresponds to a respective field of a corresponding BC in case the field was defined on the BC. Each column represents a respective attribute of all records in the Siebel RDB tables 33 and an associated value within each row representing a respective record of the table. Examples of the column may be, inter alia, a first name, a credit card number, etc.

Figure 2:
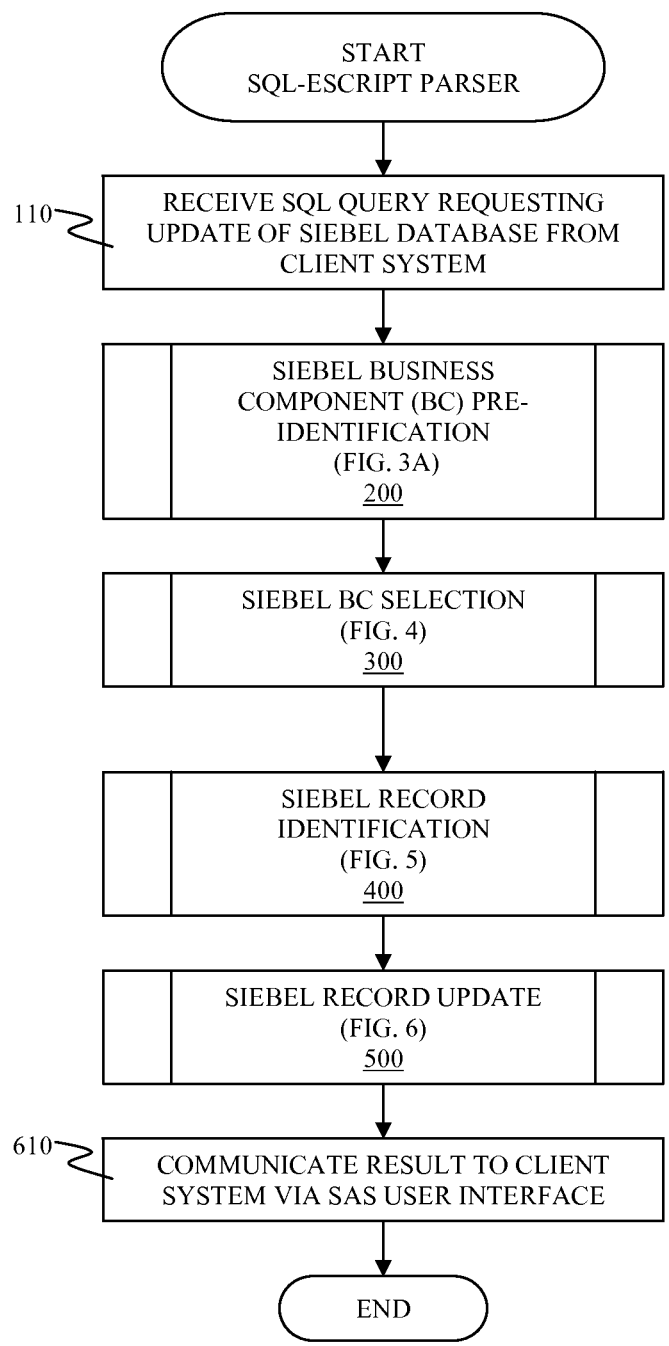
FIG. 2 is a flowchart depicting a method for searching a Siebel repository to identify needed BCs and for searching/manipulating records in the Siebel RDB tables with a SQL statement input by use of the system of FIG. 1, as performed by the SQL-eScript Parser, in accordance with the embodiments of the present invention.

FIG. 2 is a flowchart depicting a method for searching a Siebel repository to identify needed BCs and for searching/manipulating records in the Siebel RDB tables with a SQL statement input by use of the system of FIG. 1, supra, as performed by the SQL-eScript Parser, in accordance with the embodiments of the present invention.

The method of FIG. 2 comprises two phases of steps. Steps 110 through 300 operate on the Siebel repository of the Siebel DB, in identifying the Siebel BCs from the SQL statement input. Steps 400 through 610 actually search and update the Siebel RDB tables of the Siebel DB by use of the identified Siebel BCs, which correspond to respective Siebel RDB tables.

In step 110, the SQL-eScript Parser receives the SQL statement that requesting update of records in the Siebel RDB tables from the client system via the SA user interface. In this specification, terms "SQL-eScript Parser" and "parser" are used interchangeably, and terms "SQL statement" and "SQL query" are used interchangeably. The parser operates as a part of the Siebel Application (SA). For operations on the Siebel DB, the SA typically manipulates data in the Siebel RDB tables by use of the Siebel object layer comprising Siebel Business Components (BCs). A BC is a Siebel object that points to at least one Siebel RDB table of the Siebel DB. The BC can be manipulated via Siebel scripting language called eScript. Then the parser proceeds to step 200.

In step 200, the parser identifies the Siebel BCs associated with the tables appearing in the SQL statement received in step 110 supra, and creates a BC list out of the Siebel repository comprising at least one BC having a correct base table and/or joined table definition. See description of FIG. 1 supra for details of BC. See descriptions of FIGS. 3A and 3B infra for details of the Siebel BC identification in step 200. Then the parser proceeds to step 300.

In step 300, the parser checks whether the Siebel BCs identified in step 200 supra supports the update of the Siebel RDB tables as requested in the received SQL statement. The parser recognizes a BC in the BC list as supportive when the BC comprises all fields corresponding to columns referenced in the received SQL statement. See description of FIG. 4 infra for details of BC availability check. Then the parser proceeds to step 400.

In step 400, the parser identifies records from the Siebel RDB tables to update by utilizing the identified Siebel BCs in step 300 supra. See description of FIG. 5 infra for details of Siebel record identification. Then the parser proceeds to step 500.

In step 500, the parser updates the Siebel RDB tables for the records identified in step 400 supra. See description of FIG. 6 infra for details of updating the Siebel RDB tables as performed in step 500. Then the parser proceeds to step 610.

In step 610, the parser returns the result from step 500 supra in response to the SQL statement received in step 110 supra to the client system via the SAS user interface. Then the parser terminates processing the received SQL statement. The parser may loop back to step 110 supra to receive another SQL statement for processing of steps 110 through 610.

Figure 3A:
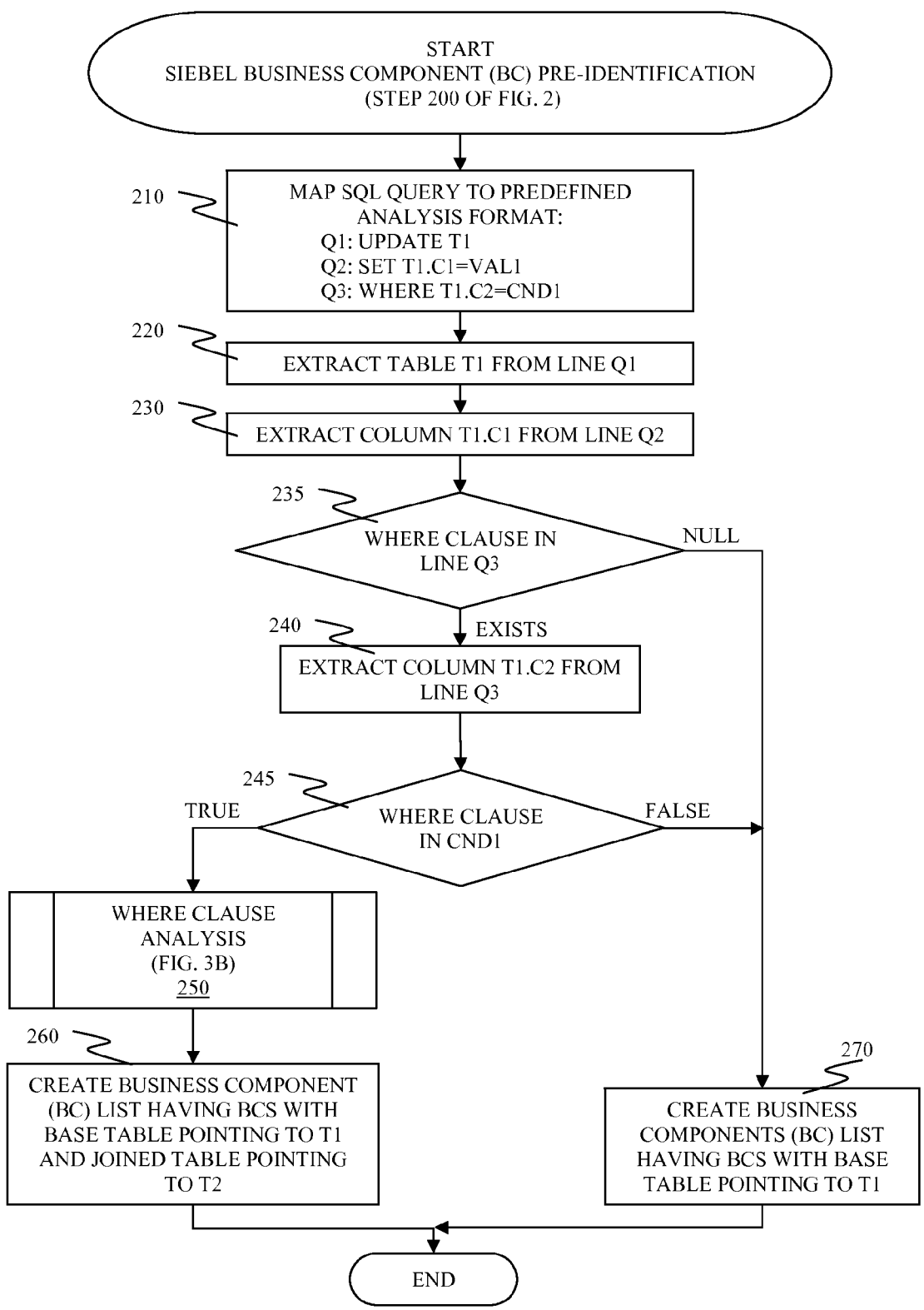
FIG. 3A is a flowchart depicting a method for searching a Siebel repository, as performed by the parser in step 200 of FIG. 2, in accordance with the embodiments of the present invention.

FIG. 3A is a flowchart depicting a method for searching the Siebel repository based on the table/fields contained in the SQL statement, as performed by the parser in step 200 of FIG. 2, supra, in accordance with the embodiments of the present invention.

In step 210, the parser maps the SQL statement received from step 110 supra to a first predefined analysis format. In one embodiment of the present invention, the SQL statement is an UPDATE statement with a syntax

```
Q1: UPDATE T1
Q2: SET T1.C1 = VAL1
Q3: WHERE T1.C2 = CND1,
``` wherein line Q1 dictates to update T1 that is a first table to update, wherein line Q2 dictates to set a first column in the first table T1.C1 with a first value VAL1, wherein line Q3 dictates to determine whether or not a second column in the first table T1.C2 has a value identical to a first condition CND1. The SQL query directs to update T1 by setting the T1.C1 with VAL1 if T1.C2 is identical to CND1. Then the parser proceeds with step 220.

In step 220, the parser extracts the first table T1 from line Q1. Then the parser proceeds with step 230.

In step 230, the parser extracts the first column T1.C1 from line Q2. Then the parser proceeds with step 240.

In step 235, the parser determines whether WHERE clause of the SQL query exists. If the parser determines that WHERE clause in line Q3 exists, then the parser proceeds with step 240. If the parser determines that WHERE clause in line Q3 is null, then the parser proceeds with step 270.

In step 240, the parser extracts the second column T1.C2 from line Q3. Then the parser proceeds with step 245.

In step 245, the parser determines whether the first condition CND1 of line Q3 has another WHERE clause embedded. If the parser determines that the first condition CND1 has WHERE clause, then the parser proceeds with step 250. If the parser determines that the first condition CND1 does not have WHERE clause but a plain value VAL2, then the parser proceeds with step 260.

In step 250, the parser analyzes WHERE clause in line Q3, and extracts other columns/tables appearing in WHERE clause of the first condition CND1. See description of FIG. 3B infra for details of analyzing the WHERE clause. Then the parser proceeds with step 260.

In step 260, the parser creates a BC list out of the Siebel repository comprising business components (BCs) with a base table pointing to the first table T1 and a joined table pointing to a second table T2 that appears in the WHERE clause in the first condition CND1. Then the parser proceeds with step 300 of FIG. 2 supra.

In step 270, the parser creates a BC list out of the Siebel repository comprising Siebel business components (BCs) with a base table pointing to the first table T1. Then the parser proceeds with step 300 of FIG. 2 supra.

Figure 3B:
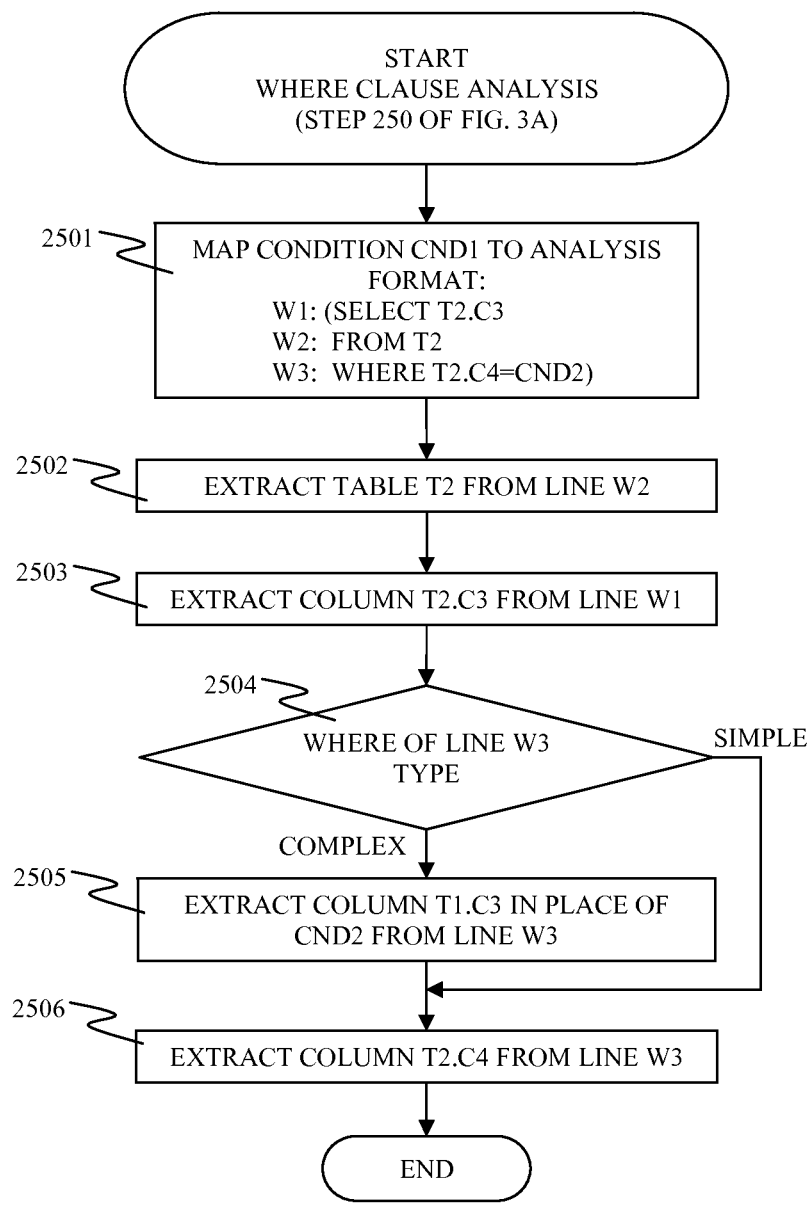
FIG. 3B is a flowchart depicting a method for searching a Siebel repository, as performed by the parser in step 250 of FIG. 3A, in accordance with the embodiments of the present invention.

FIG. 3B is a flowchart depicting a method for searching a Siebel repository based on the table/fields contained in a SQL statement, as performed by the parser in step 250 of FIG. 3A, supra, in accordance with the embodiments of the present invention.

In step 2501, the parser maps the first condition CND1 from line Q3 of the SQL query to a second predefined analysis format. In one embodiment of the present invention, the first condition CND1 is a SELECT statement with a syntax

```
W1: (SELECT T2.C3
W2: FROM T2
W3: WHERE T2.C4 = CND2),
``` wherein lines W1 and W2 dictate to select a third column T2.C3 from the second table T2, and wherein line W3 dictates to determine whether or not a fourth column in the second table T2.C4 has a value identical to a second condition CND2. The first condition CND1 results in selecting T2.C3 from T2 if T2.C4 is identical to CND2. Then the parser proceeds with step 2502.

In step 2502, the parser extracts the second table T2 from line W2. Then the parser proceeds with step 2503.

In step 2503, the parser extracts the third column T2.C3 of the second table T2 from line W1. Then the parser proceeds with step 2504.

In step 2504, the parser determines whether WHERE clause of line W3 comprising a second condition CND2 is complex or simple. In this specification, a complex WHERE clause is defined as a first type of WHERE clause having either one column and a SQL statement or two columns in the condition, and a simple WHERE clause is defined as a second type of WHERE clause having one column and a fixed value in the condition. If the parser determines that the second condition CND2 is another column, which indicates that WHERE clause in line W3 is complex, the parser proceeds with step 2505. If the parser determines that the second condition CND2 is a third value VAL3, which indicates that WHERE clause in line W3 is simple, then parser proceeds with step 2506.

In step 2505, the parser extracts a third column of the first table T1.C3 and replaces the second condition CND2 with the extracted T1.C3. Then the parser proceeds with step 2506.

In step 2506, the parser extracts a fourth column of the second table T2.C4 from line W3. Then the parser proceeds with step 260 of FIG. 3A supra.

Figure 4:
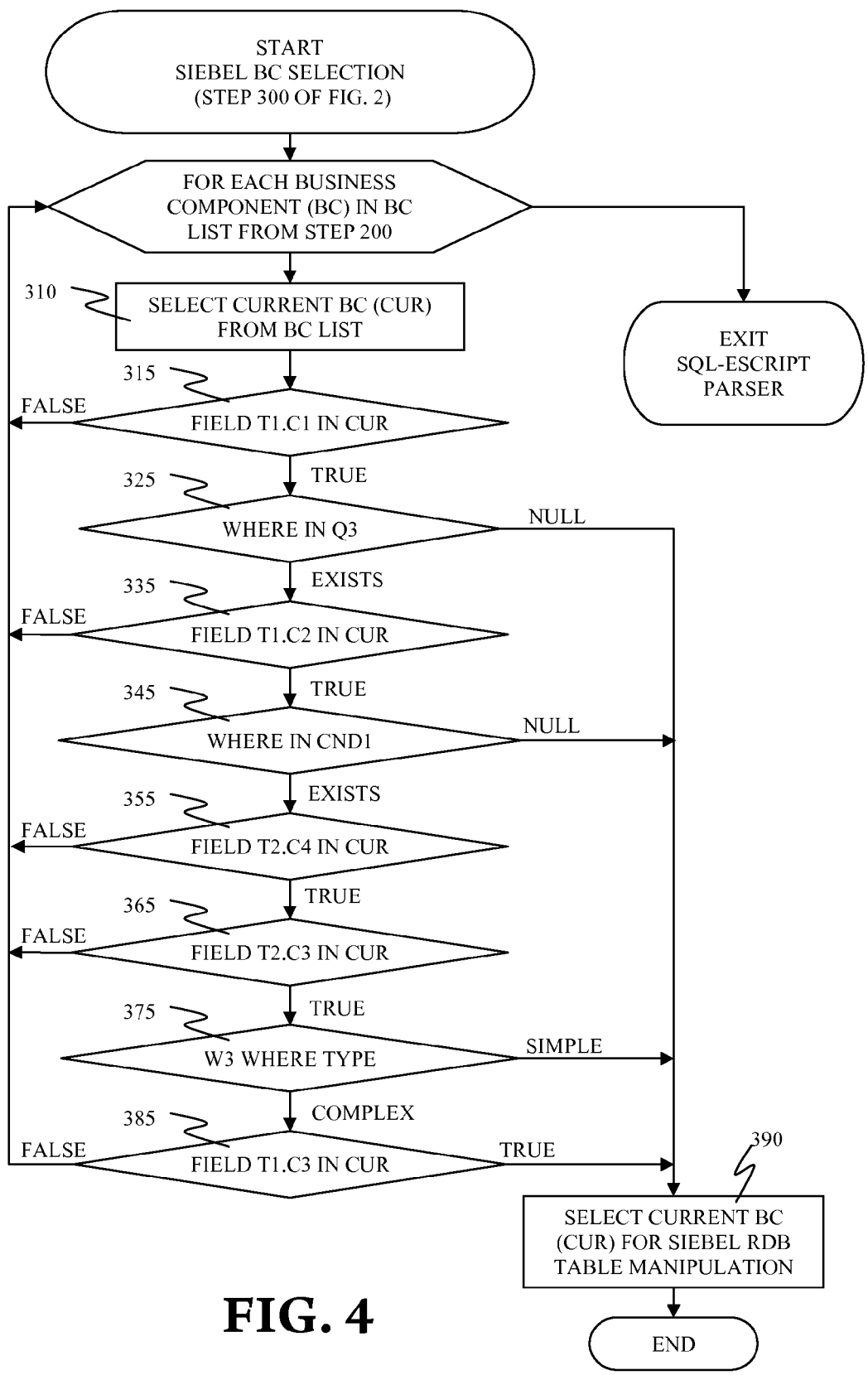
FIG. 4 is a flowchart depicting a method for identifying a Siebel BC in a pre-populated list, as performed by the parser in step 300 of FIG. 2, in accordance with the embodiments of the present invention.

FIG. 4 is a flowchart depicting a method for identifying/selecting a Siebel BC by searching the BC list created from step 200 of FIG. 2, as performed by the parser in step 300 of FIG. 2, supra, in accordance with the embodiments of the present invention.

The parser performs steps 310 through 385 for each BC in the BC list created from step 200 of FIG. 2 supra, to identify a BC having all the fields required to execute the input SQL statement. Upon scanning all BCs in the BC list without identifying the BC, the parser terminates processing the SQL statement received in step 110 of FIG. 2 supra because there is no BC having fields corresponding to columns of the SQL statement.

In step 310, the parser selects a BC (CUR) that had not been processed from the BC list. Then the parser proceeds with step 315.

In step 315, the parser determines if CUR has a first field corresponding to the first column T1.C1. If the parser determines that CUR has the first field, then the parser proceeds with step 325. If the parser determines that CUR does not have the first field, then the parser loops back to step 310 supra to select a next BC.

In step 325, the parser determines if line Q3 of the SQL statement has WHERE clause. If the parser determines that line Q3 of the SQL statement has WHERE clause, then the parser proceeds with step 335. If the parser determines that line Q3 of the SQL statement does not have WHERE clause, indicating that CUR has all fields corresponding to respective columns of the SQL statement, then the parser proceeds with step 390.

In step 335, the parser determines if CUR has a second field corresponding to the second column T1.C2. If the parser determines that CUR has the second field, then the parser proceeds with step 345. If the parser determines that CUR does not have the second field, then the parser loops back to step 310 supra to select a next BC.

In step 345, the parser determines if a first condition CND1 in line Q3 of the SQL statement has WHERE clause. If the parser determines that CND1 has WHERE clause, then the parser proceeds with step 355. If the parser determines that CND1 does not have WHERE clause, which indicates that CUR has all fields corresponding to respective columns of the SQL statement, then the parser proceeds with step 390.

In step 355, the parser determines if CUR has a fourth field corresponding to the fourth column T2.C4 from the second table T2. If the parser determines that CUR has the fourth field, then the parser proceeds with step 365. If the parser determines that CUR does not have the fourth field, then the parser loops back to step 310 supra to select a next BC.

In step 365, the parser determines if CUR has a third field corresponding to the third column T2.C3 from the second table T2. If the parser determines that CUR has the third field, then the parser proceeds with step 375. If the parser determines that CUR does not have the third field, then the parser loops back to step 310 supra to select a next BC.

In step 375, the parser determines whether WHERE clause of line W3 comprising a second condition CND2 is complex or simple. See description of step 2504 of FIG. 3B supra for definition of WHERE clause type determination. If the parser determines that WHERE clause in line W3 is complex, then the parser proceeds with step 385. If the parser determines that WHERE clause in line W3 is simple, then the parser proceeds with step 390.

In step 385, the parser determines if CUR has a fifth field corresponding to the fifth column T1.C3 from the first table T1. If the parser determines that CUR has the fifth field, then the parser proceeds with step 390. If the parser determines that CUR does not have the fifth field, then the parser loops back to step 310 supra to select a next BC.

In step 390, the parser identifies CUR, the current BC from the BC list, as "available" indicating that CUR can be used in manipulating the Siebel RDB tables as requested by the received SQL statement, because all columns appearing in the SQL query has respectively corresponding field in CUR. Then the parser proceeds with step 400 of FIG. 2 supra.

Figure 5:
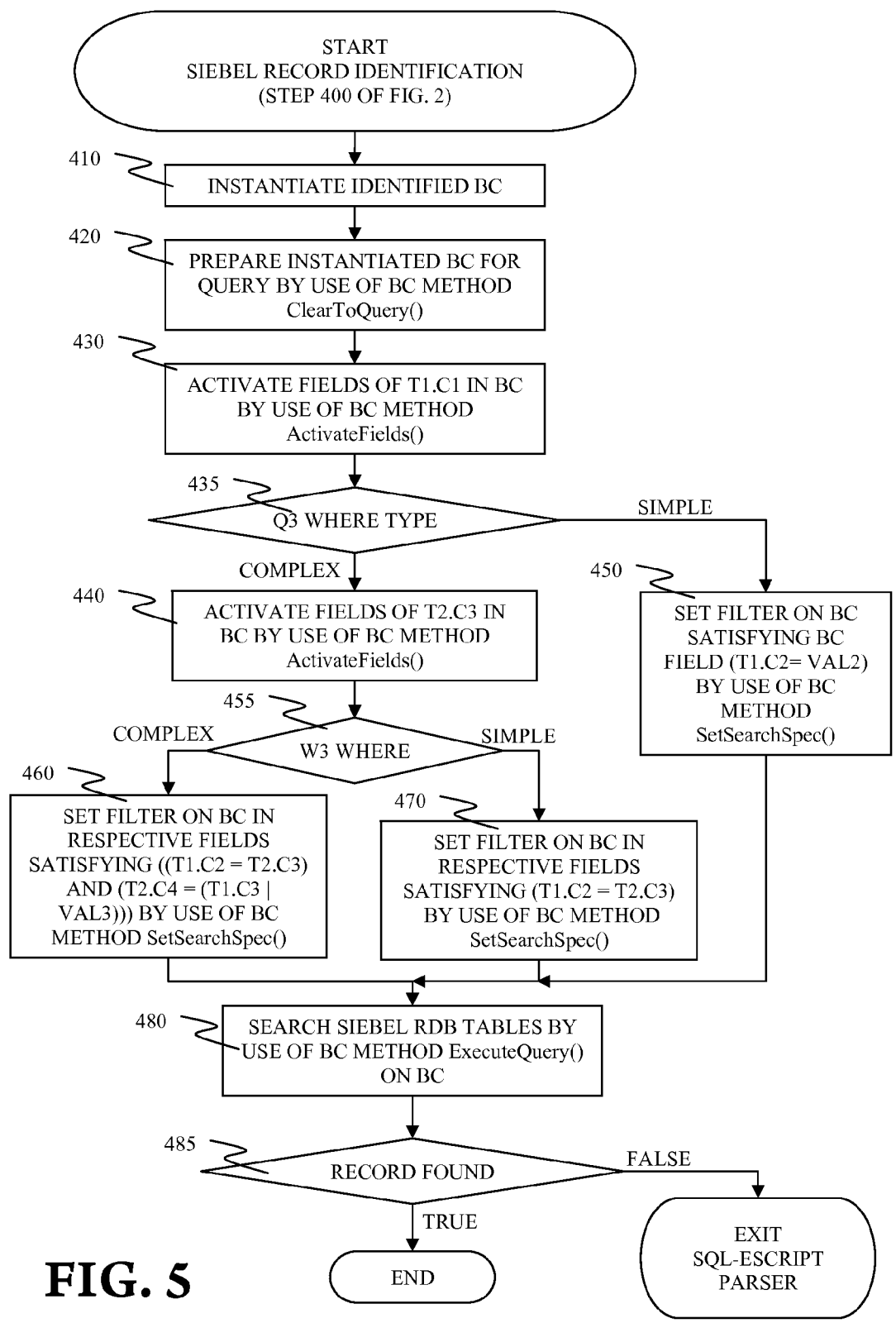
FIG. 5 is a flowchart depicting a method for identifying Siebel records in a Siebel RDB Table corresponding to the identified BCs, as performed by the parser in step 400 of FIG. 2, in accordance with the embodiments of the present invention.

FIG. 5 is a flowchart depicting a method for identifying Siebel records in a Siebel RDB Table corresponding to the identified BCs, as performed by the parser in step 400 of FIG. 2, supra, in accordance with the embodiments of the present invention.

In step 410, the parser instantiates the BC identified/selected from step 300 of FIG. 2 supra with values provided in the received SQL statement from step 110 supra. Then the parser proceeds with step 420.

In step 420, the parser prepares the BC instantiated from step 410 supra, for a search against the Siebel RDB tables. In one embodiment of the present invention, step 420 employs ClearToQuery( ) method of eScript, which clears a current eScript query and sort specifications on the BC. In Siebel eScript, BCs have associated data structures corresponding to relational database record of the Siebel RDB tables. A BC comprises data units called fields, which are accessible through BC methods. The BC supports getting and setting field values, moving backward and forward through data records in the BC, and filtering changes to data managed by the BC. Then the parser proceeds with step 430.

In step 430, the parser activates fields corresponding to T1.C1 in the BC prepared from step 420 supra. In one embodiment of the present invention, step 430 employs ActivateFields( ) method of eScript, which allows queries to retrieve data for a field specified as an argument. Then the parser proceeds with step 435.

In step 435, the parser determines whether WHERE clause of line Q3 of the SQL statement comprising the first condition CND1 is complex or simple. See description of step 2504 of FIG. 3B supra for definition of WHERE clause type determination. If the parser determines that WHERE clause in line Q3 is complex, then the parser proceeds with step 440. If the parser determines that WHERE clause in line Q3 is simple, then the parser proceeds with step 450.

In step 440, the parser activates fields corresponding to T2.C3 in the BC prepared from step 420 supra. In one embodiment of the present invention, step 440 employs ActivateFields( ) method of eScript. Then the parser proceeds with step 455.

In step 450, the parser sets filter condition on the BC to discover fields corresponding to T1.C2 having respective values identical to the second value VAL2. In one embodiment of the present invention, step 450 employs SetSearchSpec( ) method of eScript, sets a search specification for a particular field. Then the parser proceeds with step 455.

In step 455, the parser determines whether WHERE clause of line W3 in the first condition CND1 is complex or simple. See description of step 2504 of FIG. 3B supra for definition of WHERE clause type determination. If the parser determines that WHERE clause in line W3 is complex, then the parser proceeds with step 460. If the parser determines that WHERE clause in line W3 is simple, then the parser proceeds with step 470.

In step 460, the parser sets the filter condition on the BC to discover fields satisfying two Boolean conditions (value (T1.C2)=value(T2.C3)) AND (value(T2.C4)=(value(T1.C3) OR VAL3)). A first Boolean condition is that fields corresponding to T1.C2 having respective values identical to fields corresponding to T2.C3. A second Boolean condition is that fields corresponding to T2.C4 having respective values identical to fields corresponding to T1.C3 or the third value VAL3. In one embodiment of the present invention, step 460 employs SetSearchSpec( ) method of eScript. Then the parser proceeds with step 480.

In step 470, the parser sets the filter condition on the BC to discover fields satisfying a Boolean condition (value(T1.C2) =value(T2.C3)), mandating that fields corresponding to T1.C2 having respective values identical to fields corresponding to T2.C3. In one embodiment of the present invention, step 470 employs SetSearchSpec( ) method of eScript. Then the parser proceeds with step 480.

In step 480, the parser searches the Siebel RDB tables of the Siebel DB with the instantiated and configured BC from previous steps 450 or 460 or 470 supra. In one embodiment of the present invention, step 480 employs ExecuteQuery( ) method of eScript, which returns the data records to-be-updated using the criteria established with SetSearchSpec( ) method from steps 450, 460, and/or 470 supra. Then the parser proceeds with step 485.

In step 485, the parser determines if a record is found as a result of a search performed in step 480 supra. If the parser determines that at least one data record is returned, then the parser proceeds with step 500 of FIG. 2 supra. If the parser determines that no data record matching the instantiated and configured BC is found, the parser terminates processing the SQL statement received in step 110 of FIG. 2 supra.

Figure 6:
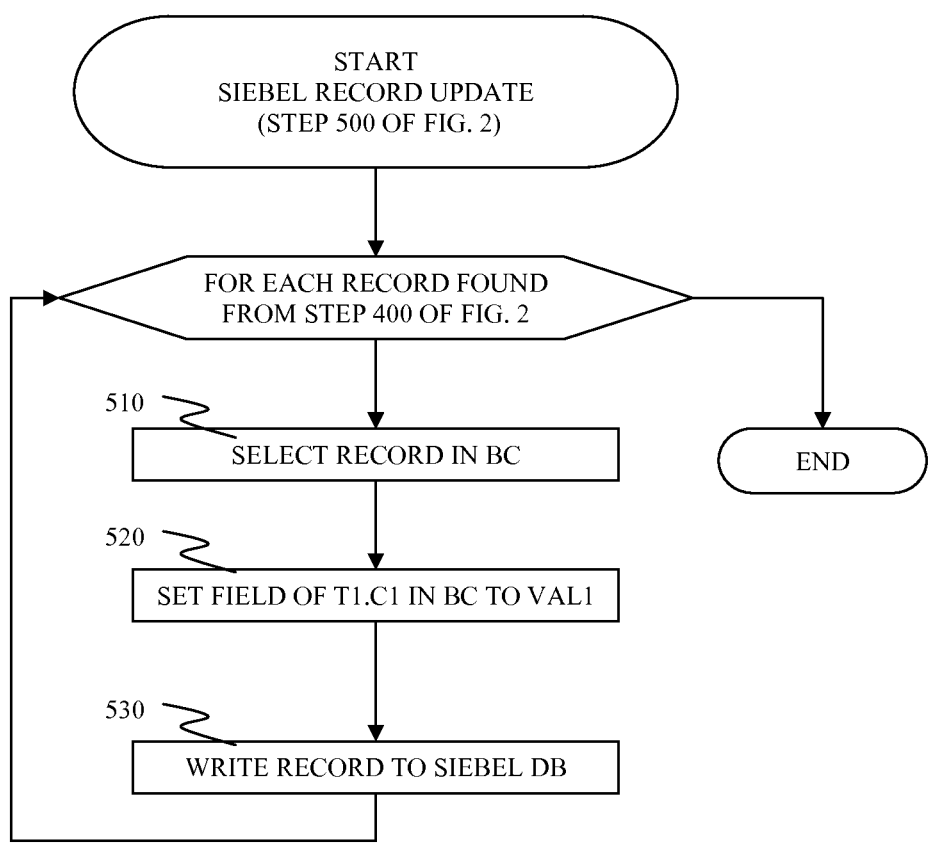
FIG. 6 is a flowchart depicting a method for updating records in the Siebel RDB tables in the Siebel DB, as identified by step 400 of FIG. 2, in accordance with the embodiments of the present invention.

FIG. 6 is a flowchart depicting a method for updating records in the Siebel RDB tables in the Siebel DB, as identified by step 400 of FIG. 2 supra, in accordance with the embodiments of the present invention.

The parser performs steps 510 through 530 for each record found from step 400 of FIG. 2 supra, to update the records pursuant to the received SQL statement. Upon updating all records on the Siebel DB that were identified in step 400 supra, the parser proceeds with step 610 of FIG. 2 supra.

In step 510, the parser selects a record in the respective BC. In one embodiment of the present invention, the SAS is configured to have a maximum ten thousand (10,000) records for a BC, and each record of the BC is selected in an order predefined by the core application Siebel. Wherein more than 10,000 records correspond to the BC, an eScript logic supporting the SQL-eScript Parser enables the BC to update all records by processing 10,000 records at a time in an order until all records are processed. In another embodiment of the present invention, the SAS is configured to have any number of records for a BC. Then the parser proceeds with step 520.

In step 520, the parser prepares the selected record in the BC for an update by setting the field corresponding to T1.C1 in the BC to the first value VAL1. Then the parser proceeds with step 530.

In step 530, the parser writes the prepared record from step 520 supra to the Siebel RDB table. Then the parser loops back to step 510 supra for a next record.

Figure 7:
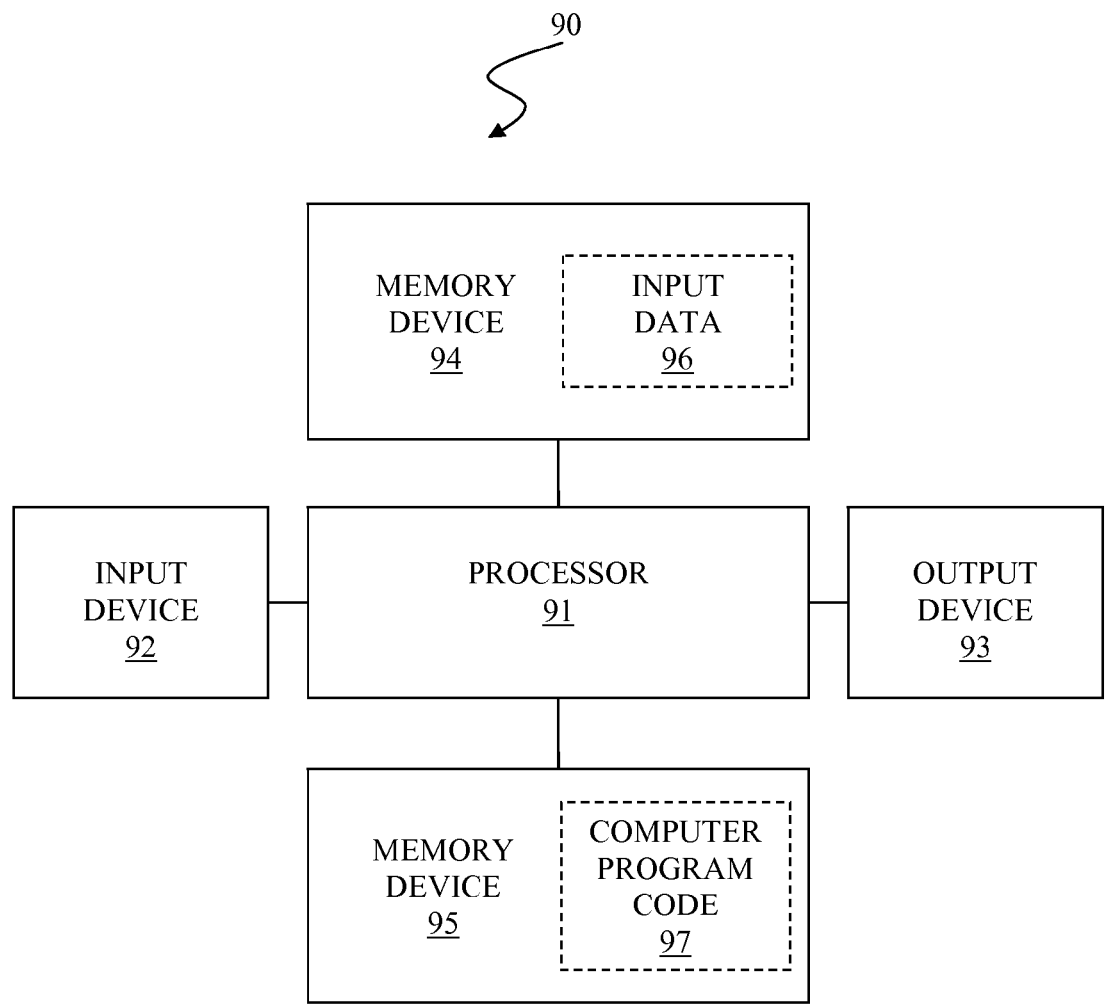
FIG. 7 illustrates a computer system used for manipulating a Siebel DB with a SQL statement, in accordance with the embodiments of the present invention.

FIG. 7 illustrates a computer system used for manipulating a Siebel DB with a SQL statement, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for manipulating a Siebel DB with a SQL statement of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for multiple authentications by independent sources for enhanced site access security.

In another embodiment, the invention provides a method that performs the process steps of the invention on a subscription, advertising and/or fee basis. That is, a service provider, such as a Solution Integrator, can offer to create, maintain, and support, etc., a process for manipulating a Siebel DB with a SQL statement of the present invention. In this case, the service provider can create, maintain, and support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for manipulating a Siebel database (SDB) with a Structured Query Language (SQL) statement, the method comprising:

receiving, by a parser running on a processor of a server system, the SQL statement from a client system coupled to the server system, wherein the SDB comprises a Siebel repository and at least one relational database (RDB) table, the Siebel repository comprising at least one business component (BC) that enables controlling of Siebel data model of the SDB, said at least one RDB table storing actual data of the Siebel data model in relational database format, wherein the Siebel data model described by the Siebel repository is independent from the relational database format of said at least one RDB table, wherein the SQL statement requests modification of a first RDB table of said at least one RDB table by setting a first column of the first RDB table to a first value for records of the first RDB table satisfying a first WHERE clause of the SQL statement;

creating a BC list comprising at least one BC of the Siebel repository, said at least one BC being associated with the received SQL statement;

selecting a BC of said at least one BC from the created BC list responsive to determining that the BC comprises all fields respectively corresponding to all columns of all RDB tables represented in the received SQL statement;

identifying a first group of records of said all RDB tables, the first group of records corresponding to the selected BC;

updating the identified first group of records within the RDB tables of the SDB pursuant to the received SQL statement; and communicating the updated first group of records of the SDB to the client system.

2. The method of claim 1, said creating comprising:

mapping the received SQL statement to a first line "UPDATE T1", a second line "SET T1.C1=VAL1", and the first WHERE clause "WHERE T1.C2=CND1", wherein T1 is the RDB table to modify, wherein T1.C1 is the first column of the first RDB table, wherein VAL1 is the first value, wherein T1.C2 is a second column of the first RDB table that is compared to a first condition CND1, such that the first line and the second line of the received SQL statement are applied only for the records in T1 satisfying the first WHERE clause;

extracting T1 of the first line, T1.C1 of the second line, and T1.C2 of the first WHERE clause from said mapping; and inserting, in the BC list, a BC having a base table pointing to T1 having columns from said extracting.

3. The method of claim 2, said inserting comprising:

determining that CND1 comprises a second WHERE clause handling a second RDB table (T2); and inserting, in the BC list, the BC having a base table pointing to T1 having columns from said extracting, wherein the BC further comprises a joined table pointing to T2 such that the BC represents all RDB tables represented in the received SQL statement.

4. The method of claim 3, said selecting comprising:

ascertaining that the BC comprises a first field corresponding to T1.C1 and a second field corresponding to T1.C2;

discovering that CND1 of the first WHERE clause comprises a select clause "SELECT T2.C3 FROM T2" and the second WHERE clause "WHERE T2.C4=CND2", wherein T2 is the second RDB table from which a third column of the second RDB table T2.C3 is selected when the second WHERE clause is satisfied as a fourth field of the second RDB table T2.C4 being equal to a second condition CND2, which is selected from the group consisting of a third value VAL3 and a third column of the first RDB table T1.C3;

ascertaining, responsive to said discovering, that the BC comprises a third field corresponding to T2.C3 and a fourth field corresponding to T2.C4; and selecting the BC comprising the first field, the second field, the third field, and the fourth field, respectively corresponding to T1.C1, T1.C2, T2.C3, and T2.C4, from the generated BC list such that said all fields are accessible via the BC.

5. The method of claim 1, said identifying comprising:

instantiating the selected BC with values provided in the received SQL statement;

preparing the instantiated BC for a query against said at least one RDB table of the SDB by use of eScript BC methods comprising ClearToQuery( ), ActivateFields( ), and SetSearchSpec( ) such that the prepared BC has filters set for conditions provided in the received SQL statement, wherein the eScript BC methods enable manipulation of said at least one RDB tables of the SDB with the Siebel data model in the Siebel repository; and locating the first group of records responsive to searching said at least one RDB table by use of another eScript BC method ExecuteQuery( ) for the first group of records.

6. The method of claim 1, said method further comprising:

providing at least one support service for at least one of creating, integrating, hosting, maintaining, and deploying computer-readable program code in the computer system, said program code being executed by the processor to implement said receiving the SQL statement, said creating the BC list, said selecting the BC, said identifying the first group of records, said updating the identified first group of records, and said communicating the updated first group of records.

7. A computer program product comprising: a computer readable hardware storage device having a computer readable program code embodied therein, said computer readable program code containing instructions which, upon being executed by a processor of a server system of a computer system, perform a method for manipulating a Siebel database (SDB) with a Structured Query Language (SQL) statement, said method comprising:

receiving, by a parser running on a processor of a server system, the SQL statement from a client system coupled to the server system, wherein the SDB comprises a Siebel repository and at least one relational database (RDB) table, the Siebel repository comprising at least one business component (BC) that enables controlling of Siebel data model of the SDB, said at least one RDB table storing actual data of the Siebel data model in relational database format, wherein the Siebel data model described by the Siebel repository is independent from the relational database format of said at least one RDB table, wherein the SQL statement requests modification of a first RDB table of said at least one RDB table by setting a first column of the first RDB table to a first value for records of the first RDB table satisfying a first WHERE clause of the SQL statement;

creating a BC list comprising at least one BC of the Siebel repository, said at least one BC being associated with the received SQL statement;

selecting a BC of said at least one BC from the created BC list responsive to determining that the BC comprises all fields respectively corresponding to all columns of all RDB tables represented in the received SQL statement;

identifying a first group of records of said all RDB tables, the first group of records corresponding to the selected BC;

updating the identified first group of records within the RDB tables of the SDB pursuant to the received SQL statement; and communicating the updated first group of records of the SDB to the client system.

8. The computer program product of claim 7, said creating comprising:
   mapping the received SQL statement to a first line "UPDATE T1", a second line "SET T1.C1=VAL1", and the first WHERE clause "WHERE T1.C2=CND1", wherein T1 is the first RDB table to modify, wherein T1.C1 is the first column of the first RDB table, wherein VAL1 is the first value, wherein T1.C2 is a second column of the first RDB table that is compared to a first condition CND1, such that the first line and the second line of the received SQL statement are applied only for the records in T1 satisfying the first WHERE clause;
   extracting T1 of the first line, T1.C1 of the second line, and T1.C2 of the first WHERE clause from said mapping; and
   inserting, in the BC list, a BC having a base table pointing to T1 having columns from said extracting.

9. The computer program product of claim 8, said inserting comprising:
   determining that CND1 comprises a second WHERE clause handling a second RDB table (T2); and
   inserting, in the BC list, the BC having a base table pointing to T1 having columns from said extracting and having a joined table pointing to T2 such that the BC represents all RDB tables represented in the received SQL statement.

10. The computer program product of claim 9, said selecting comprising:
   ascertaining that the BC comprises a first field corresponding to T1.C1 and a second field corresponding to T1.C2;
   discovering that CND1 of the first WHERE clause comprises a select clause "SELECT T2.C3 FROM T2" and the second WHERE clause "WHERE T2.C4=CND2", wherein T2 is the second RDB table from which a third column of the second RDB table T2.C3 is selected when the second WHERE clause is satisfied as a fourth field of the second RDB table T2.C4 being equal to a second condition CND2, which is selected from the group consisting of a third value VAL3 and a third column of the first RDB table T1.C3;
   ascertaining, responsive to said discovering, that the BC comprises a third field corresponding to T2.C3 and a fourth field corresponding to T2.C4; and
   selecting the BC comprising the first field, the second field, the third field, and the fourth field, respectively corresponding to T1.C1, T1.C2, T2.C3, and T2.C4, from the generated BC list such that said all fields are accessible via the BC.

11. The computer program product of claim 7, said identifying comprising:
   instantiating the selected BC with values provided in the received SQL statement;
   preparing the instantiated BC for a query against said at least one RDB table of the SDB by use of eScript BC methods comprising ClearToQuery( ), ActivateFields( ), and SetSearchSpec( ) such that the prepared BC has filters set for conditions provided in the received SQL statement, wherein the eScript BC methods enable manipulation of said at least one RDB tables of the SDB with the Siebel data model in the Siebel repository; and
   locating the first group of records responsive to searching said at least one RDB table by use of another eScript BC method ExecuteQuery( ) for the first group of records.

12. A computer system comprising a server system, a processor of the server system, a memory coupled to the processor, and a computer hardware readable storage device coupled to the processor, said storage device containing program code configured to be executed by the processor via the memory to implement a method for manipulating a Siebel database (SDB) with a Structured Query Language (SQL) statement, said manipulating comprising:
   receiving, by a parser running on the processor of the server system, the SQL statement from a client system coupled to the server system, wherein the SDB comprises a Siebel repository and at least one relational database (RDB) table, the Siebel repository comprising at least one business component (BC) that enables controlling of Siebel data model of the SDB, said at least one RDB table storing actual data of the Siebel data model in relational database format, wherein the Siebel data model described by the Siebel repository is independent from the relational database format of said at least one RDB table, wherein the SQL statement requests modification of a first RDB table of said at least one RDB table by setting a first column of the first RDB table to a first value for records of the first RDB table satisfying a first WHERE clause of the SQL statement;
   creating a BC list comprising at least one BC of the Siebel repository, said at least one BC being associated with the received SQL statement;
   selecting a BC of said at least one BC from the created BC list responsive to determining that the BC comprises all fields respectively corresponding to all columns of all RDB tables represented in the received SQL statement;
   identifying a first group of records of said all RDB tables, the first group of records corresponding to the selected BC;
   updating the identified first group of records within the RDB tables of the SDB pursuant to the received SQL statement; and
   communicating the updated first group of records of the SDB to the client system.

13. The computer system of claim 12, said creating comprising:
   mapping the received SQL statement to a first line "UPDATE T1", a second line "SET T1.C1=VAL1", and the first WHERE clause "WHERE T1.C2=CND1", wherein T1 is the first RDB table to modify, wherein T1.C1 is the first column of the first RDB table, wherein VAL1 is the first value, wherein T1.C2 is a second column of the first RDB table that is compared to a first condition CND1, such that the first line and the second line of the received SQL statement are applied only for the records in T1 satisfying the first WHERE clause;
   extracting T1 of the first line, T1.C1 of the second line, and T1.C2 of the first WHERE clause from said mapping; and
   inserting, in the BC list, a BC having a base table pointing to T1 having columns from said extracting.

14. The computer system of claim 13, said inserting comprising:
   determining that CND1 comprises a second WHERE clause handling a second RDB table (T2); and
   inserting, in the BC list, the BC having a base table pointing to T1 having columns from said extracting and having a joined table pointing to T2 such that the BC represents all RDB tables represented in the received SQL statement.

15. The computer system of claim 14, said selecting comprising: ascertaining that the BC comprises a first field corresponding to T1.C1 and a second field corresponding to T1.C2;
   discovering that CND1 of the first WHERE clause comprises a select clause "SELECT T2.C3 FROM T2" and the second WHERE clause "WHERE T2.C4=CND2", wherein T2 is the second RDB table from which a third column of the second RDB table T2.C3 is selected when the second WHERE clause is satisfied as a fourth field of the second RDB table T2.C4 being equal to a second condition CND2, which is selected from the group consisting of a third value VAL3 and a third column of the first RDB table T1.C3;

ascertaining, responsive to said discovering, that the BC comprises a third field corresponding to T2.C3 and a fourth field corresponding to T2.C4; and selecting the BC comprising the first field, the second field, the third field, and the fourth field, respectively corresponding to T1.C1, T1.C2, T2.C3, and T2.C4, from the generated BC list such that said all fields are accessible via the BC.

16. The computer system of claim 12, said identifying comprising:

instantiating the selected BC with values provided in the received SQL statement;

preparing the instantiated BC for a query against said at least one RDB table of the SDB by use of eScript BC methods comprising ClearToQuery( ), ActivateFields( ), and SetSearchSpec( ) such that the prepared BC has filters set for conditions provided in the received SQL statement, wherein the eScript BC methods enable manipulation of said at least one RDB tables of the SDB with the Siebel data model in the Siebel repository; and locating the first group of records responsive to searching said at least one RDB table by use of another eScript BC method ExecuteQuery( ) for the first group of records.

\* \* \* \* \*